United States Patent Office
3,178,339
Patented Apr. 13, 1965

3,178,339
PROCESS FOR PROTECTION OF KERATINE MATERIAL
Wilhelm Ernst Frick, Basel-Land, and Walter Stammbach, Basel, Switzerland, assignors to J. R. Geigy A.-G., Basel, Switzerland
No Drawing. Filed Mar. 7, 1962, Ser. No. 177,975
Claims priority, application Switzerland, Dec. 24, 1957, 54,113/57
13 Claims. (Cl. 167—37)

The present invention relates to the use of new compounds for combatting injurious insects, especially those eating keratine materials. In particular, it relates to processes for the protection of keratine material from injurious insects with new derivatives of the aminobenzoic acids and more particularly with derivatives of N-sulphonated aminobenzoic acid arylamides. The invention can be broken up into two aspects.

According to the first aspect of the invention, it relates to a process for the protection of keratine material from injurious insects with new compounds of the structural formula

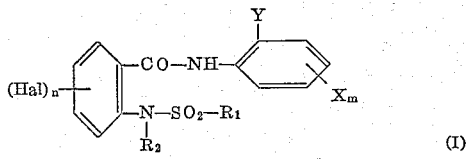

wherein $R_1$ is a lower alkyl radical,
$R_2$ represents a member selected from the group consisting of hydrogen and lower alkyl radicals,
X independently in each occurrence represents a member selected from the group consisting of chlorine, bromine and trifluoromethyl,
$m$ is an integer from 1 to 4,
Y represents a member selected from the group consisting of hydrogen, methyl, lower alkoxy, chlorinated phenoxy and chlorinated phenylmercapto radicals,
Hal represents an atom selected from the group consisting of chlorine and bromine,
$n$ is an integer from 1 to 3, and the total sum of $m+n$ is is at least 3 and at most 7.

Said new compounds have an excellent insecticidal activity in particular against insects in all stages of their development which injure keratine material such as moth larvae and larvae of furniture carpet beetle (*Anthrenus vorax*) and black carpet beetle (*Attagenus piceus*).

Preferred compounds of the above Formula I are those in which "Hal" is chlorine. In formula, "X" is also advantageously chlorine but when more than one X is present, possibly at least one of them can be the trifluoromethyl group. The action of the trifluoromethyl radical is equivalent to that of a halogen atom so that the one can be exchanged for the other. If the molecule contains a trifluoromethyl radical as substituent X, advantageously other radicals X are chlorine or bromine. Very active compounds are those in which the radical Y is a hydrogen atom, but the radical Y can also advantageously be a methyl or lower alkoxy group such as methoxy and ethoxy.

The radical $R_1$ is advantageously a methyl group, but it can also be other lower alkyl radicals such as ethyl, propyl and butyl. If the radical $R_2$ is not hydrogen, then it can be represented by lower alkyl radicals such as methyl, ethyl, isopropyl and butyl. The total sum of $m+n$ must be more than 2 and, advantageously, should be at least 4.

The new compounds of the Formula I can be produced by the processes described in our copending application Ser. No. 177,976 filed on even date.

As merely illustrative of compounds of Formula I useful in this first aspect there are the following (all melting points are given in degrees centigrade):

2-methane sulphonamido-5-chlorobenzoic acid-2′,3′,4′,5′-tetrachloranilide, M.P. 240–242°,
2-methane sulphonemethylamido-3,5-dichlorobenzoic acid-3′,4′-dichloranilide, M.P. 204–205°,
2-methane sulphonamido-3,5-dichlorobenzoic acid-3′,4′,5′-trichloranilide, M.P. 297–298°,
2-methane sulphonamido-5-chlorobenzoic acid-3′,4′-dichloranilide, M.P. 201–203°,
2-methane sulphonemethylamido-4,5-dichlorobenzoic acid-3′,4′-dichloranilide, M.P. 185–186°,
2-methane sulphonamido-3,5-dichlorobenzoic acid-3′,4′-dichloranilide, M.P. 248–249°,
2-methane sulphonamido-5-chlorobenzoic acid-3′-chloro-4′-bromanilide, M.P. 211–213°,
2-methane sulphonamido-5-chlorobenzoic acid-3′,4′,5′-trichloranilide, M.P. 240–242°,
2-methane sulphonamido-5-chlorobenzoic acid-2′,4′-dichloro-5′-trifluoromethyl anilide, M.P. 195–198°,
2-methane sulphonamido-5-chlorobenzoic acid-2′,4′,5′-trichloranilide, M.P. 198–200°,
2-methane sulphonamido-4-chlorobenzoic acid-3′,4′-dichloranilide, M.P. 255–257°,
2-methane sulphonamido-3,5-dichlorobenzoic acid-2′-methoxy-3′,4′,5′-trichloranilide M.P. 240–241°,
2-methane sulphonamido-3,5-dichlorobenzoic acid-2′,3′,4′,5′-tetrachloranilide, M.P. 280–282°,
2-methane sulphonamido-3,5-dichlorobenzoic acid-4′-chloranilide, M.P. 270–271°,
2-methane sulphonamido-3,5-dichlorobenzoic acid-3′-chloro-4′-bromanilide, M.P. 268–269.5°,
2-methane sulphonamido-3,5-dichlorobenzoic acid-2′,4′,5′-trichloranilide, M.P. 274–275°,
2-methane sulphonamido-3,5-dichlorobenzoic acid-3′-trifluoromethyl-4′-chloranilide, M.P. 237–238°,
2-methane sulphonamido-3,5-dichlorobenzoic acid-2′-(4″-chlorophenoxy)-5′-chloranilide, M.P. 206–207°,
2-(methane sulphonemethylamido)-3,5-dichlorobenzoic acid-2′,4′,5′-trichloranilide, M.P. 150–151°,
2-(methane sulphone-methylamido)-3,5-dichlorobenzoic acid - 2′ - (4″-chlorophenoxy)-5′-chloranilide, M.P. 173–175°,
2-(methane sulphone-ethylamido)-3,5-dichlorobenzoic acid-3′,4′-dichloranilide, M.P. 143–144°,
2-(methane sulphone-isoproylamido)-3,5-dichlorobenzoic acid-3′,4′-dichloranilide, M.P. 150–151°,
2-methane sulphonamido-3,5-dichlorobenzoic acid-2′-(2″,4″,5″-trichlorophenoxy)-5′-chloranilide, M.P. 210–212°,
2-methane sulphonamido-3,5-dichlorobenzoic acid-2′-(2″,4″,6″-trichlorophenoxy)-4′,5′-dichloranilide, M.P. 247–249°,
2-methane sulphonamido-3,5-dichlorobenzoic acid-2′-(4″-chlorophenylmercapto)-5′-chloranilide, M.P. 236–238°,
2-methane sulphonamido-4,5-dichlorobenzoic acid-3′,4′-dichloranilide, M.P. 228–230°,
2-methane sulphonamido-4,5-dichlorobenzoic acid-2(′4′,5′-trichloranilide, M.P. 178–180°,
2-methane sulphonamido-4,5-dichlorobenzoic acid-3′,4′,5′-trichloranilide, M.P. 271–272°,
2-ethane sulphonamido-3,5-dichlorobenzoic acid-3′,4′-dichloranilide, M.P. 257–258°,
2-methane sulphonamido-3,5-dichlorobenzoic acid-2′-methyl-4′,5′-dichloranilide M.P. 216–218°,
2-(methane sulphone-n-butylamido)-3,5-dichlorobenzoic acid-3′,4′-dichloranilide, M.P. 169–171°, 2-methane sulphonamido-3,5-dichlorobenzoic acid-2'-chloro-5'-trifluoromethyl anilide, M.P. 268–270°,
2-n-butane sulphonamido-3,5-dichlorobenzoic acid-3',4'-dichloranilide, M.P. 224–226°,
2-methane sulphonamido-3,4,5-trichlorobenzoic acid-3',4'-dichloranilide, M.P. 267–269°,
2-methane sulphonamido-5-bromobenzoic acid-3',4'-dichloranilide, M.P. 195–197°,
2-methane sulphonamido-3,5-dibromobenzoic acid-3',4'-dichloranilide, M.P. 238–240°.

The aforesaid compounds are disclosed in our said copending application Ser. No. 177,976, filed on even date.

According to the first aspect of this invention it has been found that the compounds of Formula I can be used according to the usual methods for textile finishing. They have considerable affinity to keratine material and are excellently suitable, therefore, for the protection of keratine material against injurious insects, in particular for the wash and moth proof finishing of such materials both in the raw as well as in the processed state, for example of raw or processed sheep's wool as well as other animal hairs, fells and furs. In addition to the wash and moth proof finishing in the dyebath, the compounds can also be used for the impregnation of wool or woollen articles the materials then becoming equally excellently moth proofed.

In addition to their insecticidal action on the larvae of the clothes moth, the compounds of Formula I are also active against the larvae of the black carpet and furniture carpet beetles so that the textiles, such as woollen blankets, woollen carpets, woollen underwear, woollen clothes and knitted goods treated with the compounds of Formula I by one or the other of these methods, are protected from all types of insects which are injurious to keratine material.

The agents used for the protection of keratine material against attack by injurious insects should contain the active ingredients of the Formula I in a finely distributed form. Thus, solutions, suspensions and emulsions of the active ingredients should be used.

Insofar as the active ingredients of the Formula I contain a hydrogen atom in the sulphonamide group, i.e. when $R_2$ is a hydrogen atom, in the form of their alkali metal salts they have good water solubility. They can be applied to the keratine material direct from these aqueous solutions either by dipping the material for a shorter or longer time in the alkali metal salt solutions, or spraying them with the solutions, or by treating them in the solutions at a raised temperature as in dyeing processes.

Compounds having no dissociating hydrogen atom in the sulphonamide group can be drawn onto the material to be protected for example from their aqueous suspensions or emulsions, advantageously at a raised temperature, or such suspensions or emulsions can be used for spraying the material.

Because of their improved solubility in organic solvents, these compounds are particularly well suited for application from non-aqueous media. Thus the materials to be protected can simply be impregnated with these solutions or, if a suitable solvent is chosen, the moth proof finishing can be combined with a dry cleaning process.

Propylene glycol, methyl Cellosolve, ethyl Cellosolve and dimethyl formamide have proved to be particularly suitable organic solvents to which distributing agents and/or other auxiliaries can be added. Emulsifying agents such as e.g. sulphonated castor oil, sulphite waste liquor and fatty alcohol sulphonates can be mentioned in particular as distributing agents.

Thus various carriers (such as solvents) and distributing agents are suitable for the application of the active ingredients to the keratine material, depending on the medium and physical state from which the finely distributed active ingredient is applied.

Active ingredients of the formula

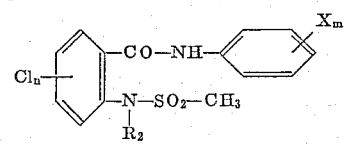

in which $R_2$ is hydrogen or a low alkyl radical, $n$ is a number from 1 to 4, each X is a halogen atom or a $CF_3$ group, $m$ is a number from 1 to 4 and the sum of $m+n$ is greater than 2 and advantageously at least 4, have proved particularly suitable for use in agents for the protection of keratine materials.

The following examples illustrate this aspect of the invention. Parts are given as parts by weight and their relationship to parts by volume is as that of grammes to cubic centimetres. Temperatures are given in degrees centigrade.

Example 1

0.5 part of 2-methane sulphonamido-3,5-dichlorobenzoic acid-3',4'-dichloranilide are dissolved with the aid of 10 parts of 0.1 N-caustic soda lye and a little alcohol. This solution is diluted with 3000 parts of water and 100 parts of wool are treated in the liquor so prepared for 15 minutes at about 60°. 5 parts of 10% acetic acid are then added and the treatment is continued at 60° for a further hour.

The wool is then tested and dried in the usual way. It is resistant to attack by the larvae of the moth, and of the black carpet and furniture carpet beetles.

Example 2

2-(methane sulphone methylamido)-3,5-dichlorobenzoic acid-3',4'-dichloranilide can be applied, for example, in the following manner:

0.5 part of active ingredient is dissolved in 10 parts of dimethyl formamide and the solution is poured into 3000 parts of water which contains about 1–2 parts of an emulsifier, e.g. sulphonated castor oil.

100 parts of wool are treated for 30 minutes in this liquor at boiling temperature. After rinsing and drying, the wool is moth proof.

Naturally, other additives as well as dyestuffs can be added to the treatment baths described in Examples 1 and 2.

Example 3

First a 20% solution of 2-(methane sulphone isopropylamido)-3,5-dichlorobenzoic acid-3',4'-dichloranilide in glycol monomethyl ether is prepared. 10 parts by volume of this solution are diluted with 200 parts by volume of a solvent suitable for dry cleaning, for example a suitable benzine fraction ("Diluan S"). If desired, other additives having a cleansing action can be added. The woolen articles are then treated in this cleaning liquid in the usual way and then centrifuged to a solvent content of about 100% of the weight of the wool. After drying, they are moth proof.

In an analogous manner, the same or analogously composed baths can also be used for the moth proof finishing of untreated or of already otherwise treated or cleaned articles.

Also similar mixtures can be used for spraying of wool in all stages of processing.

The resistance to attack by injurious insects of the keratinous textile materials treated with the compound according to this first aspect of the invention was tested by the following standard methods.

Moths: SNV-Normenblatt No. 95901
Furniture carpet beetle (Anthrenus): SNV-Normenblatt No. 95902
Black carpet beetle (Attagenus): AATCC Year Book 1952, p. 123 and ff.

According to the second aspect of the invention, it relates to a process for the protection of keratine material from injurious insects with new compounds of the structural formula

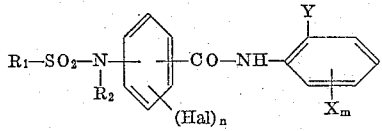

wherein $R_1$ represents a member selected from the group consisting of chlorine-substituted lower alkyl radicals, chlorinated phenyl radicals and chlorinated benzyl radicals, $R_2$ represents a member selected from the group consisting of hydrogen and lower alkyl radicals, X independently in each occurrence represents a member selected from the group consisting of chlorine and trifluoromethyl, $m$ is an integer from 1 to 3, Y represents a member selected from the group consisting of hydrogen, chlorinated phenoxy and chlorinated phenylmercapto radicals, Hal represents an atom selected from the group consisting of chlorine and bromine, $n$ is an integer from 0 to 3, and the total sum of substituents on the different aromatic nuclei in the molecule is at least 3 and at most 7.

The novel compound of the above Formula II have an excellent insecticidal activity in particular against insects in all stages of their development which injure keratine material, such as moth larvae and larvae of furniture carpet beetle (*Anthrenus vorax*) and black carpet beetle (*Attagenus piceus*).

Preferred compounds of the above Formula II are those in which "Hal" is chlorine. When in this formula "$m$" is 1, X is advantageously chlorine, but when more than one X is present, at least one of them can be the trifluoromethyl group. The action of the trifluoromethyl radical is equivalent to that of a halogen atom so that the one can be exchanged for the other. If the molecule contains a trifluoromethyl radical as substituent X, advantageously other radicals X are chlorine. Very active compounds are those in which the radical Y is a hydrogen atom.

Of particular interest with regard to their easy production and good activity are the derivatives of anthranilic acid (ortho-aminobenzoic acid) and of meta-aminobenzoic acid which are embraced by the Formula II defined above. Preferred compounds of the Formula II are in particular those in which $R_1$ represents a phenyl radical substituted by one or more chlorine atoms. In addition to chlorine, this phenyl radical $R_1$ can also advantageously contain at least one trifluoromethyl group as substituent. Also para-aminobenzoic acid derivatives having a chlorinated phenyl radical $R_1$ have good activity.

Thus, preferred compounds in this second aspect have the general formula

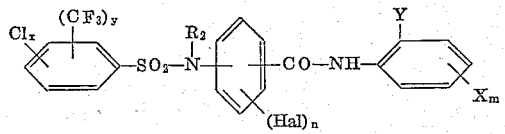

in which $R_2$, Hal, $n$ Y, X and $m$ have the meanings given above, $x$ is a number from 1 to 3 and $y$ is 0 or 1. The total sum of chlorine and trifluoromethyl substituents on the different aromatic nuclei must be greater than 2 and should advantageously be at least 4.

Chlorine-substituted lower alkyl radicals $R_1$ are those with 1–4 carbon atoms such as chloromethyl, α- or β-chlorethyl, α-chloropropyl, α-chlorobutyl, dichloromethyl and trichloromethyl.

If the radical $R_2$ is not hydrogen, it is advantageously a lower alkyl radical such as methyl, ethyl, isopropyl and butyl.

The new compounds of Formula II can be produced by the processes disclosed in our copending application Ser. No. 177,976 filed on even date.

To merely illustrate compounds of Formula II, the following are set forth (all melting points are given in degrees centigrade):

2-(3',4'-dichlorobenzene sulphonamido) - 3,5 - dichlorobenzoic acid-3",4"-dichloranilide, 263–264°, 2-(3',4'-dichlorobenzene sulphone methylamido)-3,5-dichlorobenzoic acid-3",4" - dichloranilide, M.P. 216–217.5°, 2-(3',4'-dichlorobenzene sulphonamido)-5 - chlorobenzoic acid-2",4",5"-trichloranilide, M.P. 216–217°, 2-(3',4'-dichlorobenzene sulphonamido)-benzoic acid-2",4",5"-trichloranilide, 179–180°, 3-(3'-trifluoromethyl-4'-chlorobenzene sulphonamido)-4-chlorobenzoic acid-2",4",5"-trichloranilide, M.P. 191–193°, 2-(3',4'-dichlorobenzene sulphonamido)-benzoic acid-3",4"-dichloranilide, M.P. 207–209°, 2-(3',4'-dichlorobenzene sulphone methylamido)-benzoic acid-3",4"-dichloranilide, M.P. 144–145°, 2-(3',4'-dichlorobenzene sulphonamido)-5-chlorobenzoic acid-4"-chloranilide, M.P. 221–222°, 2-(3',4'-dichlorobenzene sulphonamido)-5 - chlorobenzoic acid-3",4"-dichloranilide, M.P. 221–222°, 2-(2',4',5'-trichlorobenzene sulphonamido) - 5 - chlorobenzoic acid-3",4"-dichloranilide, M.P. 216–218°, 2-(4'-chloro-α-toluene sulphonamido)-3,5-dichlorobenzoic acid-3",4"-dichloranilide, M.P. 238–240°, 2-(3',4'-dichloro-α-toluene sulphonamido)-3,5 - dichlorobenzoic acid-3",4"-dichloranilide, M.P. 224–225°, 2-chloromethane sulphonamido-3,5-dichlorobenzoic acid-3',4'-dichloranilide, M.P. 261–263°, 2-(3'-trifluoromethyl-4'-chlorobenzene sulphonamido)-3,5-dichlorobenzoic acid-3",4"-dichloranilide, M.P. 242–243°, 2-(3',4'-dichlorobenzene sulphonamido) - 4,5 - dichlorobenzoic acid-3",4"-dichloranilide, M.P. 205–206°, 3-chloromethane sulphonamido-4-chlorobenzoic acid - 3'-trifluoromethyl-4'-chloranilide, M.P. 166–168°, 3-(3',4'-dichlorobenzene sulphonamido)-4-chlorobenzoic acid-3",4"-dichloranilide, M.P. 222–224°, 3-(3',4'-dichlorobenzene sulphonamido)-4-chlorobenzoic acid-2",4",5"-trichloranilide, M.P. 198–201°, 3-(3',4'-dichlorobenzene sulphonamido)-4-chlorobenzoic acid-3"-trifluoromethyl - 4" - chloranilide, M.P. 192–195°, 3-(3'4'-dichlorobenzene sulphone methylamido)-4-chlorobenzoic acid-3"-trifluoromethyl-4"-chloranilide, M.P. 197–199°, 3-(3'-trifluoromethyl-4'-chlorobenzene sulphonamido)-4-chlorobenzoic acid-3",4" - dichloranilide, M.P. 215–217°, 3-(3'-trifluoromethyl-4'-chlorobenzene sulphonamido)-4-chlorobenzoic acid-3"-trifluoromethyl-4"-chloranilide, M.P. 195–197°, 3-(3'-trifluoromethyl-4'-chlorobenzene sulphone methylamido)-4-chlorobenzoic acid-3"-trifluoromethyl - 4"-chloranilide, M.P. 217–220°, 3-(3'-trifluoromethyl-4'-chlorobenzene sulphonamido)-4-bromobenzoic acid-3"-trifluoromethyl-4"-chloranilide, M.P. 169–172°, 3-chloromethane sulphonamido-4-chlorobenzoic acid-2',4',5'-trichloranilide, M.P. 196–198°, 3-(4'-chlorobenzene sulphonamido) - 4 - chlorobenzoic acid-2",3",4"-trichloranilide, M.P. 198–200°, 3-(3',4'-dichlorobenzene sulphonamido)-4-chlorobenzoic acid-2",3",4"-trichloranilide, M.P. 206–209°, 3-(3'-trifluoromethyl-4'-chlorobenzene sulphonamido)-4- chlorobenzoic acid-2″,3″,4‴-trichloranilide, M.P. 210–213°,
3-(3′,4′-dichlorobenzene sulphonamido)-4-chlorobenzoic acid-3″,4″,5‴-trichloranilide, M.P. 240–242°,
3-(3′-trifluoromethyl-4′-chlorobenzene sulphonamido)-4-chlorobenzoic acid-3″,4″,5‴-trichloranilide, M.P. 221–223°,
3-(3′,4′-dichlorobenzene sulphonamido)-4-bromobenzoic acid-3″-trifluoromethyl-4″-chloranilide, M.P. 141–143°,
3-(3′-trifluoromethyl-4′-chlorobenzene-sulphonamide)-4-chlorobenzoic acid-2″-(4‴-chlorophenoxy)-5″-chloranilide, M.P. 134–138°,
3-(3′-trifluoromethyl-4′-chlorobenzene sulphonamido)-4-chlorobenzoic acid-2″-(2‴,4‴,5‴-trichlorophenoxy)-5″-trifluoromethyl anilide, M.P. 159–161°,
3-(3′,4′-dichlorobenzene sulphonamido)-4-chlorobenzoic acid-2″-(4‴-chlorophenylmercapto)-5″-chloranilide, M.P. 162–164°,
3-(3′-trifluoromethyl-4′-chlorobenzene sulphonamido)-4-chlorobenzoic acid-2″-(4‴-chlorophenylmercapto)-5″-chloranilide, M.P. 158–160°,
3-chloromethane sulphonamido-4,6-dichlorobenzoic acid-2′,4′,5′-trichloranilide, M.P. 216–218°,
3-(3′,4′-dichlorobenzene sulphonamido)-4,6-dichlorobenzoic acid-2″,4″,5‴-trichloranilide, M.P. 244–246°,
3-(3′,4′-dichlorobenzene sulphonamido)-4,6-dichlorobenzoic acid-3″-trifluoromethyl-4″-chloranilide, M.P. 170–172°,
3-(3′-trifluoromethyl-4′-chlorobenzene sulphonamido)-4,6-dichlorobenzoic acid-3″,4″dichloranilide, M.P. 158–160°,
3-(3′-trifluoromethyl-4′-chlorobenzene sulphonamido)-4,6-dichlorobenzoic acid-2″,4″,5‴-trichloranilide, M.P. 189–191°,
3-(3′-trifluoromethyl-4′-chlorobenzene sulphonamido)-4,6-dichlorobenzoic acid-3″-trifluoromethyl-4″-chloranilide, M.P. 172–173°,
3-(3′-trifluoromethyl-4′-chlorobenzene sulphone methylamido)-4,6-dichlorobenzoic acid-2″,4″,5‴-trichloranilide, M.P. 179–182°,
3-(3′-trifluoromethyl-4′-chlorobenzene sulphone ethylamido)-4,6-dichlorobenzoic acid-2″,4″,5‴-trichloranilide, M.P. 175–177°,
3-(3′-trifluoromethyl-4′-chlorobenzene sulphone-n-butylamido)4,6-dichlorobenzoic acid-2″,4″,5‴-trichloranilide, M.P. 163–165°,
4-(3′-trifluoromethyl-4′-chlorobenzene sulphonamido)-benzoic acid-3″-trifluoromethyl-4″-chloranilide, M.P. 205–208°,
4-(3′,4′-dichlorobenzene sulphonamido)-benzoic acid-3″-trifluoromethyl-4″-chloranilide, M.P. 227–229°, and
4-(3′,4′-dichlorobenzene sulphonamido)-3-chlorobenzoic acid-3″-trifluoromethyl-4″-chloranilide, M.P. 210–213°.

The foregoing compounds are set forth in our said copending application Ser. No. 177,976, filed on even date.

The compounds of Formula II can be used according to the usual methods for textile finishing. They have considerable affinity to keratine material and are excellently suitable, therefore, for the protection of keratine material against injurious insects, in particular for the wash and moth proof finishing of such materials both in the raw as well as in the processed state, for example of raw or processed sheep's wool as well as other animal hairs, feels and furs. In addition to the wash and moth proof finishing in the dyebath, the compounds can also be used for the impregnation of wool or woolen articles, the materials then becoming equally excellently moth proofed.

In addition to their insecticidal action on the larvae of the clothes moth, the compounds of Formula II are also active against the larvae of the black carpet and furniture carpet beetles so that the textiles, such as woolen blankets, woolen carpets, woolen underwear, woolen clothes and knitted goods treated with the compounds according to this second aspect by one or the other of these methods, are protected from all types of insects which are injurious to keratine material.

The agents used for the protection of keratine material against attack by injurious insects should contain the active ingredients of the Formula II in a finely distributed form. Thus, solutions, suspensions and emulsions of the active ingredients should be used.

Insofar as the active ingredients contain a hydrogen atom in the sulphonamide group, i.e. when $R_2$ is a hydrogen atom, in the form of their alkali metal salts they have good water solubility. They can be applied to the keratine material direct from these aqueous solutions either by dipping the material for a shorter or longer time in the alkali metal salt solutions, or spraying them with the solutions, or by treating them in the solutions at a raised temperature as in dyeing processes.

Compounds having no dissociating hydrogen atom in the sulphonamide group can be drawn onto the material to be protected for example from their aqueous suspensions or emulsions, advantageously at a raised temperature, or such suspensions or emulsions can be used for spraying the material.

Because of their improved solubility in organic solvents, these compounds are particularly well suited for application from non-aqueous media. Thus the materials to be protected can simply be impregnated with these solutions or, if a suitable solvent is chosen, the moth proof finishing can be combined with a dry cleaning process.

Propylene glycol, methyl Cellosolve, ethyl Cellosolve and dimethyl formamide have proved to be particularly suitable organic solvents to which distributing agents and/or other auxiliaries can be added. Emulsifying agents such as e.g. sulphonated castor oil, sulphite waste liquor and fatty alcohol sulphonates can be mentioned in particular as distributing agents.

Thus various carriers (such as solvents) and distributing agents are suitable for the application of the active ingredients to the keratine material, depending on the medium and physical state from which the finely distributed active ingredient is applied.

Active ingredients of the formula

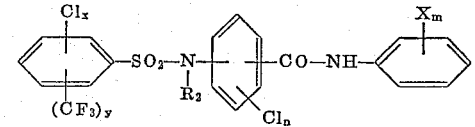

in which $R_2$ is hydrogen or a low alkyl radical, $n$ is a number from 0–3, each X is a chlorine atom or a $CF_3$ group, each of $m$ and $x$ is a number from 1–3 and $y$ is 0 or 1 have proved particularly suitable for use in agents for the protection of keratine material. In the above formula the sum of $m+n+x+y$ should advantageously be at least 4.

The following examples illustrate this second aspect of the invention. Parts are given as parts by weight and their relationship to parts by volume is as that of grammes to cubic centimetres. Temperatures are given in degrees centigrade.

*Example 4*

0.5 part of 3-(3′-trifluoromethyl-4′-chlorobenzene sulphonamido)-4-chlorobenzoic acid-2″,4″,5″-trichloranilide is dissolved with the aid of 10 parts of 0.1 N-caustic soda lye and a little alcohol. This solution is diluted with 3000 parts of water and 100 parts of wool are treated in the liquor so prepared for 15 minutes at about 60°. 5 parts of 10% acetic acid are then added and the treatment is continued at 60° for another hour.

The wool is then rinsed and dried. It is resistant to attack by the larvae of the moth and of the black carpet and furniture carpet beetles.

Example 5

2-(3',4'-dichlorobenzene sulphone methylamido)-3,5-dichlorobenzoic acid-3",4"-dichloranilide can be applied, for example, in the following manner:

0.5 part of active ingredient is dissolved in 10 parts of dimethyl formamide and the solution is poured into 3000 parts of water which contains about 1–2 parts of an emulsifier, e.g. sulphonated castor oil.

100 parts of wool are treated for 30 minutes in this liquor at boiling temperature. After rinsing and drying, the wool is moth proof.

Naturally, other additives as well as dyestuffs can be added to the treatment baths described in Examples 4 and 5.

Example 6

First a 20% solution of 3-(3',4'-dichlorobenzene sulphone methylamido)-4-chlorobenzoic acid-3"-trifluoromethyl-4"-chloranilide in glycol monomethyl ether is prepared. 10 parts by volume of this solution are diluted with 200 parts by volume of a solvent suitable for dry cleaning, for example a suitable benzine fraction ("Diluan S"). If desired other additives having a cleansing action can be added. The woolen articles are then treated in this cleaning liquid in the usual way and then centrifuged to a solvent content of about 100% of the weight of the wool. After drying, they are moth proof.

In an analogous manner, the same or analogously composed baths can also be used for the moth proof finishing of untreated or of already otherwise treated or cleaned articles.

Also similar mixtures can be used for spraying of wool in all stages of processing.

The resistance to attack by injurious insects of the keratinous textile materials treated with the compounds according to this second aspect was tested by the following standard methods.

Moths: SNV Normenblatt No. 95901
Furniture carpet beetle (Anthrenus): SNV Normenblatt No. 95902
Black carpet beetle (Attagenus): AATCC Year Book 1952, p. 123 and ff.

The instant application is a continuation-in-part of application Ser. No. 779,554, filed December 11, 1958, and of application Ser. No. 780,688, filed December 16, 1958 (both abandoned since the filing of the present application).

What we claim is:

1. A process for the protection of keratine material from injurious insects which comprises applying on the keratine fibres and on textiles containing keratine a composition containing as the essential active ingredient a compound of the formula

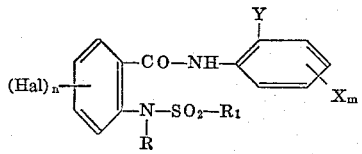

wherein
$R_1$ is lower alkyl,
$R_2$ represents a member selected from the group consisting of hydrogen and lower alkyl,
X in each occurrence represents a member selected from the group consisting of chlorine, bromine and trifluoromethyl,
$m$ is an integer from 1 to 4,
Y represents a member selected from the group consisting of hydrogen, methyl, lower alkoxy, chlorophenoxy and chlorophenylmercapto,
Hal represents an atom selected from the group consisting of chlorine and bromine,
$n$ is an integer from 1 to 3, and the total sum of $m+n$ is at least 3 and at most 7.

2. A process for the protection of keratine material from injurious insects which comprises applying on the keratine fibres and on textiles containing kertaine a composition containing as the essential active ingredient the compound 2-methane sulphonamido-3,5-dichlorobenzoic acid-3',4'-dichloranilide.

3. A process for the protection of keratine material from injurious insects which comprises applying on the keratine fibres and on textiles containing keratine a composition containing as the essential active ingredient the compound 2-methane sulphonamido-3,5-dichlorobenzoic acid-3',4',5'-trichloranilide.

4. A process for the protection of keratine material from injurious insects which comprises applying on the keratine fibres and on textiles containing keratine a composition containing as the essential active ingredient the compound 2-methane sulphonamido-3,5-dichlorobenzoic acid-2',3',4',5'-tetrachloranilide.

5. A process for the protection of keratine material from injurious insects which comprises applying on the keratine fibres and on textiles containing keratine a composition containing as the essential active ingredient the compound 2-(methane sulphone-N-methylamido)-3,5-dichlorobenzoic acid-3',4'-dichloranilide.

6. A process for the protection of keratine material from injurious insects which comprises applying on the keratine fibres and on textiles containing keratine a composition containing as the essential active ingredient the compound 2-ethane sulphonamido-3,5-dichlorobenzoic acid-3',4'-dichloranilide.

7. A process for the protection of keratine material from injurious insects which comprises applying on the keratine fibres and on textiles containing keratine a composition containing as the essential active ingredient the compound 2-methane sulphonamido-3,5-dichlorobenzoic acid-3'-trifluoromethyl-4'-chloranilide.

8. A process for the protection of keratine material from injurious insects which comprises applying on the keratine fibres and on textiles containing keratine a composition containing as the essential active ingredient the compound 2-methane sulphonamido-4,5-dichlorobenzoic acid-3',4'-dichloranilide.

9. A process for the protection of keratine material from injurious insects which comprises applying on the keratine fibres and on textiles containing keratine a composition containing as the essential active ingredient the compound 2-methane sulphonamido-4,5-dichlorobenzoic acid-3',4',5'-trichloranilide.

10. A process for the protection of keratine material from injurious insects which comprises applying on the keratine fibres and on textiles containing keratine a composition containing as the essential active ingredient a compound of the formula

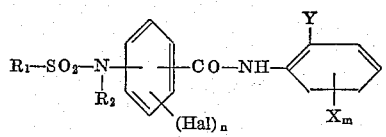

wherein
$R_1$ represents a member selected from the group consisting of chlorine-substituted lower alkyl, chlorine-substituted phenyl and chlorine-substituted benzyl,
$R_2$ represents a member selected from the group consisting of hydrogen and lower alkyl,
X in each occurrence represents a member selected from the group consisting of chlorine and trifluoromethyl,
$m$ is an integer from 1 to 3,
Y represents a member selected from the group consisting of hydrogen, chlorine-substituted phenoxy and chlorine-substituted phenylmercapto, Hal represents an atom selected from the group consisting of chlorine and bromine, $n$ is an integer from 0 to 3, and the total sum of substituents present on the different aromatic nuclei of the molecule is at least 3 and at most 7.

11. A process for the protection of keratine material from injurious insects which comprises applying on the keratine fibres and on textiles containing keratine a composition containing as the essential active ingredient the compound 3 - (3' - trifluoromethyl - 4' - chlorobenzene sulphonamido) - 4 - chlorobenzoic acid - 2'',4'',5'' - trichloranilide.

12. A process for the protection of keratine material from injurious insects which comprises applying on the keratine fibres and on textiles containing keratine a composition containing as the essential active ingredient the compound 3 - (3' - trifluoromethyl - 4' - chlorobenzene sulphonamido) - 4,6 - dichlorobenzoic acid - 2'',4'',5''-trichloranilide.

13. A process for the protection of keratine material from injurious insects which comprises applying on the keratine fibres and on textiles containing keratine a composition containing as the essential active ingredient the compound 2 - (3',4' - dichlorobenzene sulphonamido) - 4,6-dichlorobenzoic acid-2'',4'',5''-trichloranilide.

References Cited in the file of this patent

Chu: Jour. Am. Chem. Soc., vol. 67, pages 1862–1863 (1945).

Adams et al.: J. Am. Chem. Soc., vol. 76, pages 3584–3586 (1954).

Mustafa: J. Am. Chem. Soc., vol. 1949, pages 384–387 (1949).